（12） United States Patent
Navda et al.

(10) Patent No.: US 8,964,619 B2
(45) Date of Patent: *Feb. 24, 2015

(54) NETWORK ASSISTED POWER MANAGEMENT

(71) Applicant: Microsoft Corporation, Redmond, WA (US)

(72) Inventors: Vishnu Navda, Bangalore (IN); Ramachandran Ramjee, Bangalore (IN); Venkata N. Padmanabhan, Bangalore (IN); Shravan Rayanchu, Madison, WI (US)

(73) Assignee: Microsoft Corporation, Redmond, WA (US)

( * ) Notice: Subject to any disclaimer, the term of this patent is extended or adjusted under 35 U.S.C. 154(b) by 49 days.

This patent is subject to a terminal disclaimer.

(21) Appl. No.: 13/930,269

(22) Filed: Jun. 28, 2013

(65) Prior Publication Data

US 2013/0290526 A1  Oct. 31, 2013

Related U.S. Application Data

(62) Division of application No. 12/363,450, filed on Jan. 30, 2009, now Pat. No. 8,488,501.

(51) Int. Cl.
G08C 17/00 (2006.01)
H04L 12/26 (2006.01)
H04W 52/02 (2009.01)

(52) U.S. Cl.
CPC ....... *H04L 12/2668* (2013.01); *H04W 52/0229* (2013.01); *Y02B 60/50* (2013.01)
USPC ........................................... 370/311

(58) Field of Classification Search
None
See application file for complete search history.

(56) References Cited

U.S. PATENT DOCUMENTS

| | | | |
|---|---|---|---|
| 7,996,554 B1 * | 8/2011 | Venkatraman | 709/232 |
| 2003/0236819 A1 * | 12/2003 | Greubel | 709/201 |
| 2007/0211727 A1 * | 9/2007 | Sethi et al. | 370/395.4 |

* cited by examiner

*Primary Examiner* — Ian N Moore
*Assistant Examiner* — Brian T Le

(57) ABSTRACT

Embodiments of the claimed subject matter provide an approach to managing the power state of wireless network devices in a wireless network. Embodiments include a process for modifying the scheduling of data distribution device by referencing the data buffer in an access point for data intended for a wireless network client operating under a power-saving mode, and re-arranging the distribution queue of the access point to be granted priority for a time which coincides with the delivery of a polling beacon to the power-saving wireless client. Other embodiments include a method to create virtual access points for a particular usage, and to leverage access points in a wireless network for particular usages of devices in range.

16 Claims, 9 Drawing Sheets

Exemplary Networking Environment 700

Exemplary Process 200

Exemplary Process 300

Exemplary Process 500

Exemplary Process 600

Exemplary Networking
Environment 700

Exemplary Networking
Environment 800

NETWORK ASSISTED POWER MANAGEMENT

CROSS REFERENCE TO RELATED APPLICATIONS

This application is a divisional application of U.S. Utility patent application Ser. No. 12/363,450, filed Jan. 30, 2009, which is incorporated herein by reference in its entirety and for all purposes.

BACKGROUND

Computerized systems have made a significant contribution towards the advancement of modern society and are utilized in a number of applications to achieve advantageous results. The transmission of data using electronic means is one such example that has benefited from the utilization of computerized systems. As the number of consumer electronics incorporating wireless networking functionality have increased recently, the need for improved wireless connectivity has also increased in response. Wi-Fi is the trade name for the popular wireless technology used in home networks, mobile phones, video games and other electronic devices that provide a form of wireless networking capability. In particular, the term Wi-Fi is interpreted to include the various IEEE 802.11 technologies (which include 802.11n, 802.11b, 802.11g and 802.11a).

A Wi-Fi enabled device such as a personal computer (PC), video game console, mobile phone, portal audio player or personal data assistant (PDA) can connect to the Internet when within range of a wireless network connected to the Internet. The coverage of one or more interconnected access points—also called a hotspot—can comprise (and provide wireless connectivity to) an area as small as a single room or as large as many square miles covered by overlapping access points.

A wireless access point (WAP) connects a group of wireless devices (also called "clients") to an adjacent wired local area network (LAN). An access point is similar to a network hub, relaying data between connected wireless devices in addition to a (typically) single connected wired device, most often an Ethernet hub or switch, allowing wireless devices to communicate with other wired devices in the network.

However, for a wireless device to maintain constant Wi-Fi connectivity, power must be consumed at a greatly advanced rate. A conventional solution to this issue has been to incorporate a mode of operation referred to as power saving mode (PSM) in many wireless network devices. A client in a power-saving mode operates in a "sleep" state, during which data is neither received nor transmitted by the client, and power consumption is extremely low. Conventional applications include automatically changing the operating mode of a device to the power-saving mode if a period of idleness for the client exceeds a certain duration.

In conventional PSM schemes, a client commencing operation under PSM will send an indication to the access point. The client subsequently goes into a sleep state, and data received in the access point intended for the sleeping client is buffered in the access point until the client is awake (no longer in PSM). Meanwhile, the client wakes up periodically (e.g., every 100 ms) to receive a beacon from the access point to determine if the access point has any outstanding data for the client. If outstanding data is detected, the access point will send the client a communication, typically in the form of a traffic indication map ("TIM") beacon indicating so. The client subsequently responds to a TIM beacon by sending a poll message to the access point and discontinues operating in a PSM and remains active until the outstanding data is received. Once the outstanding data is received, the client may resume operation under a PSM. Likewise, the client may (re)commence operating in an active operating mode to send packets.

Unfortunately, the efficacy of this solution is often compromised within proximity to other wireless network devices. For example, when a client in a PSM sends a poll message to the access point in response to a TIM beacon indicating the presence of outstanding data intended for the PSM client, and the PSM client will typically, remain active to receive the packets. However, the access point may also be transmitting data to other wireless network devices. A typical access point distributes data received according to a data structure such as a queue. Thus, if the data intended for the PSM client is detected but not at (or near) the front of the transmission queue, the PSM client will remain in an active mode whilst the data ahead of the data intended for the PSM client is delivered to its intended recipients (other clients).

Furthermore, the application of power saving modes is not effective for all Wi-Fi applications. Voice over Internet Protocol (VoIP) is a popular telecommunications application which allows users to communicate verbally over an established Internet connection. However, operating in a PSM often adds latency to the transmission of data packets (through the periodic sleeping). The nature of verbal communication typically involves a rapid exchange of data packets, rendering unnecessary latency highly undesirable. Accordingly, devices engaging in VoIP may be unable to take advantage of the benefits of a PSM. Likewise, PSM clients operating in proximity to (e.g., using the same access point as) a client using a VoIP application may suffer from a decreased effectiveness in the PSM due to the rapid transfer of data packets by the client executing a VoIP application. In addition, other Wi-Fi applications, such as active web-browsing and gaming over the Internet or LAN, may be subject to the same concerns.

Recent standards extend power-saving support for VoIP. For example, WMM® Power Save is a recent addition to WiFi standards and allows an access point to send data to a client immediately, using high priority, in response to a client that sends any data frames to the access point. While this mechanism can help VoIP clients that periodically send data to return to a low-power state quickly, it provides no such benefit to VoIP clients that are not periodic (e.g., due to silence suppression) or other clients that perform web browsing or other non-periodic network activities.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments are directed to wireless networks with one or more access points. Specifically, a wireless network having one or more wireless network clients having variable power states.

In one embodiment, the power state of a wireless network device in a wireless network is managed by scheduling data transmissions in the network. Scheduling the data transmissions in the network may be achieved by modifying the distribution queue in an access point or proxy device to coincide with the periods of activity for power-saving clients. By modifying the scheduling of data transmissions in the wireless network, a wireless network client is able to return to operating under a low-power sleep state sooner, thereby advantageously saving energy.

In another embodiment, the power state of one or more wireless network devices in a wireless network are managed by virtualizing access points for particular activities. Virtualizing access points may be achieved by instantiating a virtualized access point for each wireless network client or, alternatively, for an entire class of activities being performed by one or more connected wireless network clients. Each of the virtualized access points may be further customized to optimize the power management of the particular usage or activity. By virtualizing access points, the benefits provided by modifying the scheduling of data transmission in the wireless network denoted above may be performed with greater efficiency when extended to multiple clients.

In another embodiment, the power states of one or more wireless network devices in a wireless network are managed by leveraging access points in the wireless network. The access points are customized for a particular activity, and the wireless network clients connect to the access point customized for the current activity being performed by the wireless network client, within range. In other embodiments, wireless network clients may be shifted to another access point in range, if a previous access point experiences large amounts of data trafficking.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
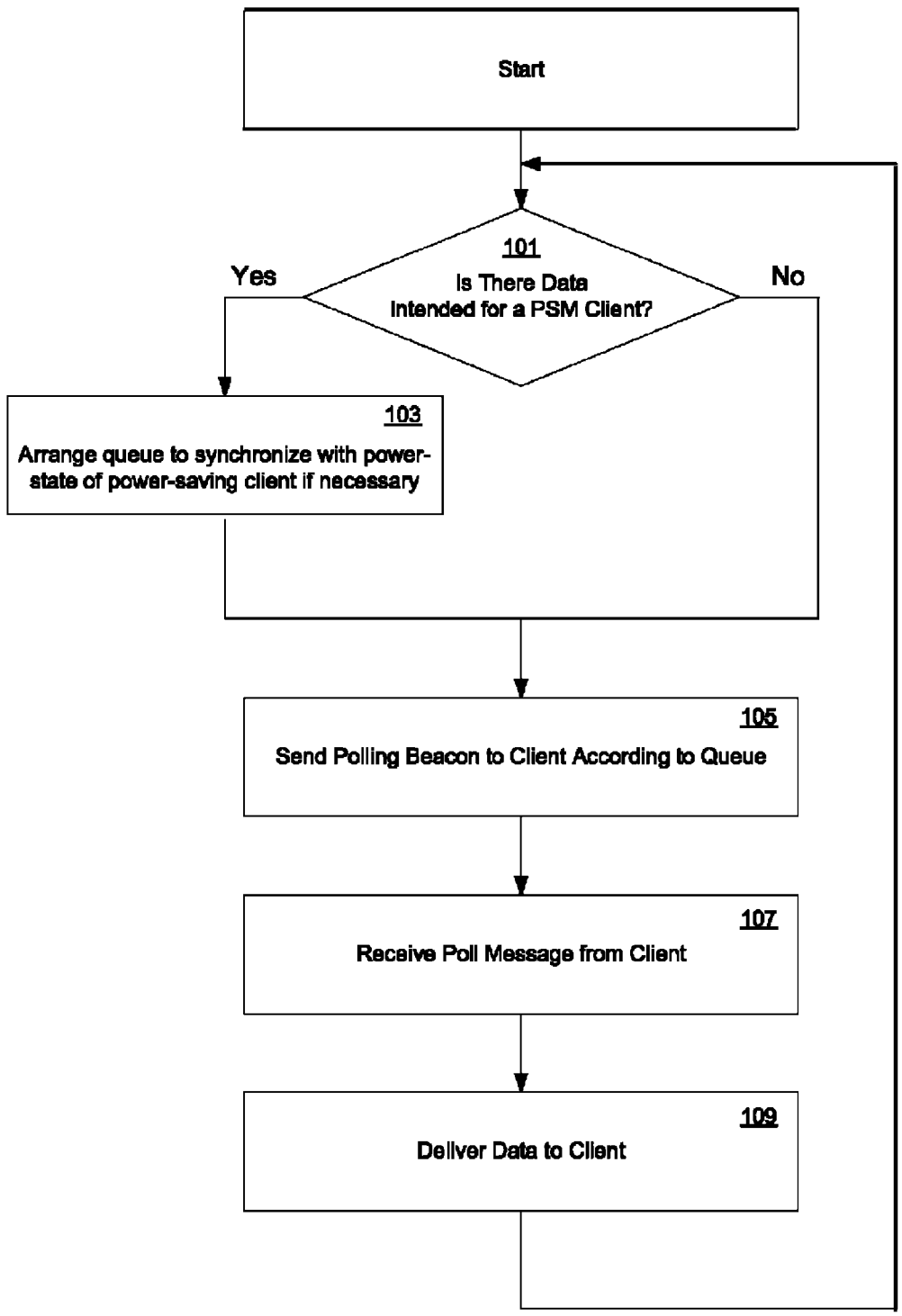
FIG. 1 depicts a flowchart of an exemplary method for scheduling data transmissions in a network to manage the power state of a wireless network device, in accordance with various embodiments.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follows are presented and discussed in terms of a process. Although steps and sequencing thereof are disclosed in a figure herein (e.g., FIG. 1) describing the operations of this process, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the following embodiments, an approach is described for automated power management of wireless network clients in a wireless network. In one embodiment, the power states of the wireless network clients in the wireless network are managed by adapting the scheduling of data packet distribution of the access point. In another embodiment, the power state of the wireless network clients in the wireless network are managed by creating virtualized access points customized for the wireless network client and/or the particular activity being performed by the wireless network client. In a still further embodiment, the power states of wireless network clients are managed by leveraging other active access points in the network within range of the wireless network client.

Data Transmission Scheduling

With reference to FIG. 1, a flowchart of an exemplary process 100 for scheduling data transmissions in a network to manage the power state of a wireless network device is depicted. Steps 101-109 describe exemplary steps comprising the method 100 in accordance with the various embodiments herein described.

In a typical configuration, an access point providing a plurality of wireless network clients WiFi connectivity will periodically send a "polling beacon" to each of the wireless network clients connecting to the access point. When an access point contains data intended for a wireless network client, the polling beacon specific for the wireless network client will include a TIM field, indicating that data is outstanding for the given client. Subsequently, when a wireless network client receives a polling beacon including a TIM field from the access point, the wireless network client will respond by sending a "poll message" to the access point. Upon reception of the poll message, communication of the data intended for the wireless network client is initiated. A power-saving wireless network client may enter into a energy-conservative sleep mode whenever there is no activity detected (e.g., no active transmission or reception of data). While in sleep mode, the power-saving network client re-awakens to receive polling beacons from the access point for the presence of outstanding data intended for the client.

In alternate embodiments, a wireless network may be configured such that a proxy computing device, such as a server, operates as an access point, through which all data from the wireless clients in range travel. According to these embodiments, the poll message from a wireless network client may be received by the proxy. In one embodiment, data received by the access point to be distributed to the wireless network clients connecting to the access point is stored in a data buffer in the access point. The data buffer may be implemented in, for example, the memory of the access point or proxy device.

At step 101, the data buffer of the access point or proxy device is accessed to determine the presence of data intended for the wireless network clients in the wireless network. Determining the presence of data intended for the wireless network clients may be performed by, for example, examining the header of each data packet and referencing the destination field. Accordingly, any data packets in the buffer of data which have as a destination the power-saving client may thus be detected. If data intended for a power-saving client is detected in step 101, the process proceeds to step 103 as described below. Otherwise, the process proceeds directly to step 105.

At step 103, the buffer of data is arranged into a data queue to synchronize with a power state of the power-saving wireless network client, if necessary. In one embodiment, data in the data buffer of an access point is arranged in a queue, wherein data is distributed in the order the data is received. Synchronizing the data queue with a power state of a wireless network client may be performed by configuring the position of data in the data queue to correspond to the transmission of a polling beacon including a TIM field to a power-saving wireless client. For example, the power state of a wireless network client may be synchronized with the queue of data by re-positioning the delivery of a polling beacon including a TIM field from the access point to the power-saving client to correspond to a time wherein no other data transmissions are expected and/or scheduled to occur. If, however, the data in the data buffer is already synchronized with an estimated reception of a poll message from the power-saving wireless client, no modification may be necessary.

In one embodiment, synchronizing the queue may be performed by delaying (e.g., rescheduling) the transmission of a polling beacon with a TIM field to a power-saving client until a later polling beacon, whereupon the data intended for the power-saving client is awarded a high priority. By temporarily withholding transmission of a polling beacon with a TIM field but granting priority to the data when the polling beacon with the TIM field is delivered, the data may be delivered to a power-saving client immediately upon receiving the corresponding poll message, thus preventing a power-saving client from remaining active during a time the access point is delivering data to other wireless clients. Accordingly, a power-saving wireless network client is often able to extend the duration of operating in a low-power (e.g., sleep) mode and reduce the time spent operating in an active mode.

In one embodiment, a polling beacon with a TIM field intended for a power-saving wireless network client may only be delayed, and thus, may not be moved earlier in the data queue than its original position. In further embodiments, a polling beacon with a TIM field intended for a power-saving wireless network client may not be delayed to exceed the next scheduled polling beacon intended for the power-saving wireless network client.

At step 105, a polling beacon including TIM fields is sent to the intended wireless network client recipient according to the data queue. If the data queue was modified in step 103, the polling beacon is delivered according to the modified queue. Otherwise polling beacons are sent to the wireless network clients according to data queue without modification.

At step 107, a poll message from a wireless network client is received in the access point (or proxy) in response to the polling beacon delivered in step 105. The poll message may be implemented as, for example, a null (empty) data packet communicated from a wireless network client.

Finally at step 109, the data is transmitted to the recipient upon the reception of the poll message, as performed in step 107. Once data has been transmitted to the recipient, steps 101-109 may be repeated until the data buffer is empty and will re-commence once data has been received in the access point and stored in the data buffer.

While embodiments have been described to include a single power-saving client, embodiments are well suited to extend to configurations comprising multiple power-saving clients with or without additional, active (e.g., non-power saving) wireless clients in the wireless network, whereby the power states of each of the power-saving wireless network clients in the wireless network are managed as herein described.

Arranging Data in a Data Buffer

Figure 2:
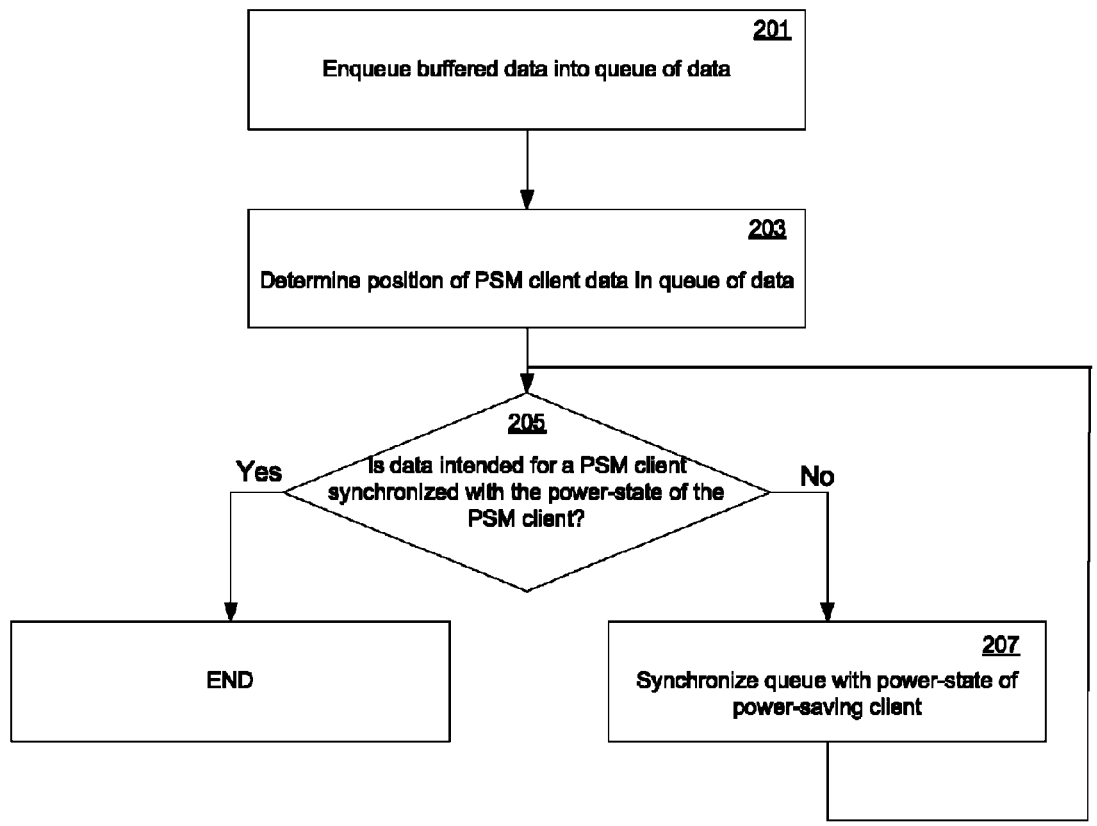
FIG. 2 depicts a flowchart of an exemplary process of arranging data in a data buffer into a queue of data, in accordance with various embodiments.

With reference to FIG. 2, a flowchart of an exemplary process 200 of arranging data in a data buffer into a queue of data is depicted. Steps 201-207 describe exemplary steps comprising the process 200 in accordance with the various embodiments herein described.

At step 201, data buffered in the data buffer of an access point (or proxy device) is enqueued (e.g., added) into a queue of data when the data is received.

At step 203, the queue of data is referenced to determine the position of the data intended for a power-saving network client in the data queue. If the position of the PSM client data is at the front of the queue (e.g., no data is scheduled for transfer with a higher priority) the process proceeds to step 205. Otherwise, if the position of the data intended for the PSM client is not at the front of the queue, the process proceeds directly to step 207.

At step 205, data in the data queue is calculated to determine if the data queue corresponds to (e.g., is synchronized with) the power states of the power-saving wireless network clients that are the intended targets of data in the data queue. The data queue is synchronized with the power states of the power-saving wireless network clients when, for example, the delivery of polling beacons including a TIM field from the access point to the power-saving clients correspond to the plurality of times wherein data intended for the respective power-saving clients is singularly prioritized. If the data queue is not synchronized with the power states of the power-saving wireless network clients that are the intended targets of data in the data queue, the process proceeds to step 207. Once the data queue is determined to be in synch with the power-saving wireless network clients, the process terminates.

At step 207, the data queue is synchronized to correspond to the power-state of a PSM client. Synchronizing the data queue is provided in greater detail with reference to FIG. 3 and the process 300 described below and may include, for example, arranging the data queue such that the data intended for the PSM client will have priority over all other scheduled data transmissions in the queue (e.g., the data intended for the PSM client in the data queue will be at the front of the data queue) when the next polling beacon is delivered to the PSM client.

Synchronizing Data with a Power State of a Wireless Client

Figure 3:
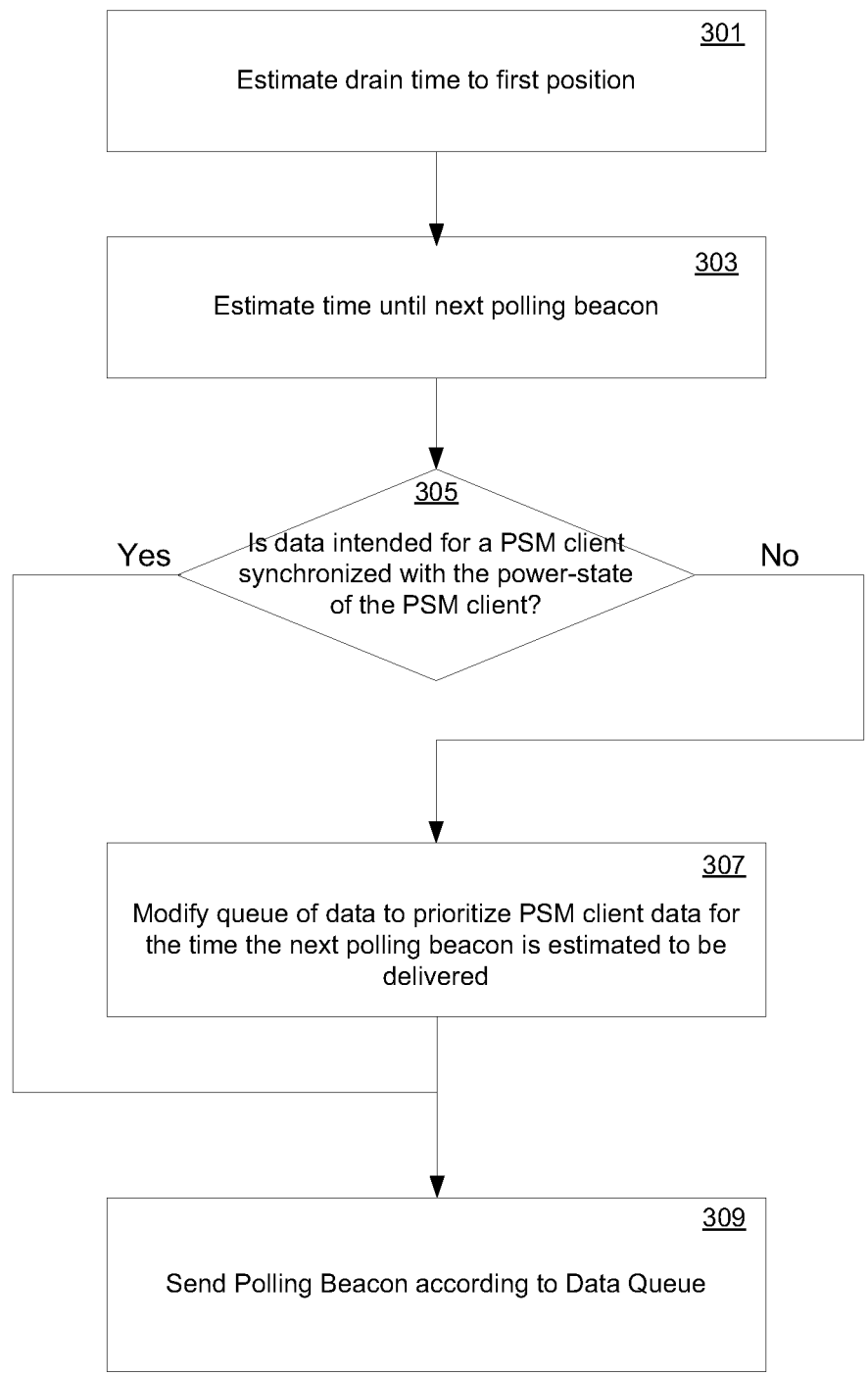
FIG. 3 depicts a flowchart of an exemplary process of—rearranging data in a queue of data to synchronize with a power state of a wireless network device, in accordance with various embodiments.

With reference to FIG. 3, a flowchart of an exemplary process 300 of re-arranging data in a queue of data to synchronize with a power state of a wireless network device is depicted. Steps 301-309 describe exemplary steps comprising the process 300 in accordance with the various embodiments herein described. In one embodiment, steps 301-309 may comprise the steps performed during step 207 of FIG. 2

At step 301, the drain time to the position of data having as its intended recipient a PSM client stored in the data queue is estimated. Estimating the drain time may comprise, for example, estimating the drain (e.g., transmission) time for each of the data packets in the data queue ahead of the data intended for the PSM client in the data queue.

At step 303, the length of time until the next polling beacon is delivered to the PSM client is estimated. The next polling beacon may, for example, comprise the immediate next polling beacon. In alternate embodiments, the next polling beacon may comprise other subsequent polling beacons. In some embodiments polling may be performed periodically within a pre-determined schedule and the length of time until the next polling beacon may be calculated by subtracting the elapsed time since the last polling beacon was received from the periodic interval. In alternative embodiments, the polling intervals may be decided on an ad hoc basis by either the client or the access point.

In embodiments which feature an ad hoc schedule of polling beacons, the determining component communicates the time until the next polling beacon should be sent to the other component with every polling beacon sent or received. For example, the access point may be the determining component and may communicate to the client the delay until the next polling beacon should be transmitted to the client whenever a polling beacon is received from the client. Accordingly, the length of time until the next polling beacon is sent to the PSM client may be calculated by subtracting the elapsed time since the last polling beacon was sent from the interval between the last polling beacon and the next polling beacon is sent, as previously determined.

At step 305, the position in the data queue for the data intended for the PSM client is verified. Determining the position in the data queue for the PSM client may be performed as described with reference to step 203 in FIG. 2. If the position of the data intended for the PSM client is determined to be at the front of the queue, the process proceeds directly to step 309. Alternatively, if, as determined at step 305, the position in the data queue for the data intended for the PSM client is not at the front of the queue, the process proceeds to step 307.

At step 307, the queue of data is modified to prioritize the data intended for the PSM client in the position corresponding to the estimated time a future polling beacon is estimated to be sent. In one embodiment, the drain time for each packet of data in the data queue is calculated in step 301. If the drain time until the packet intended for the PSM client coincides with the estimated drain time until the next polling beacon is sent to the PSM client (calculated in step 303), no modification of the data queue may be necessary. However, if the drain time until the packet intended for the PSM client does not coincide with the estimated drain time until the next polling beacon is sent to the PSM client, the data queue may be modified such that the data packet(s) intended for the PSM client is arranged to be in the position corresponding to the estimated time the polling beacon is sent.

In one embodiment, data in the data queue intended for the PSM client may be modified by re-positioning in the data queue the data intended for the PSM client. The data packets intended for other recipients between the original position of the data intended for the PSM client in the queue through the position corresponding to the reception of the next polling beacon are shifted forward (e.g., closer to the front of the queue). The data intended for the PSM client is then enqueued directly into the position corresponding to the delivery of a subsequent, specific polling beacon to the PSM client and reception of a corresponding poll message, and prioritized above other data transmissions, such that the access point will not transmit data to other wireless network clients before transmitting the re-positioned data intended for the PSM client for the time following the delivery of the specific polling beacon. In one embodiment, data intended for the power-saving client may be re-positioned in the data queue to a position which coincides with the expected delivery of the next polling beacon after the position in the queue of the data intended for the power-saving client, such that data for the power-saving client will not be distributed before data intended for other clients that was ahead of the data for the power-saving client in the data queue.

Thus, the data in the data queue intended for the PSM client may only be delayed (e.g., may only be re-enqueued into a position in the queue after its original position) and may not be re-enqueued into a position above its original position, to ensure fairness to other recipients in the wireless network. By re-positioning the data intended for a power-saving wireless network client in the data queue to correspond with the delivery of a specific periodic polling beacon and prioritizing the data intended for the PSM client for the specific polling beacon, the access point can ensure the immediate delivery of data upon the reception of a corresponding poll message, thus advantageously reducing the time a power-saving client is required to stay awake to receive the data intended for the power-saving client. Accordingly, by reducing the time a power-saving client is required to stay awake to receive data, the power-saving client may be able to remain in a power-saving (e.g., sleep) mode for longer durations between intervals of activity, as well as return from an active state to a power-saving mode more quickly, thereby reducing the rate of power consumption.

At step 309, polling beacons are sent to their intended wireless network recipients from the access point according to the synchronized data queue. A polling beacon containing a TIM field is delivered to the power-saving wireless network client to coincide with the remaining queue such that no active data transmissions will be scheduled to occur in the time one or more data packets in the access point are delivered to the power-saving wireless network client. Once a polling beacon containing a TIM field is delivered to the power-saving client, the access point will wait to receive a poll message from the client, whereupon the access point will begin the immediate transmission of data to the power-saving wireless network client.

Estimating Drain Time

Figure 4:
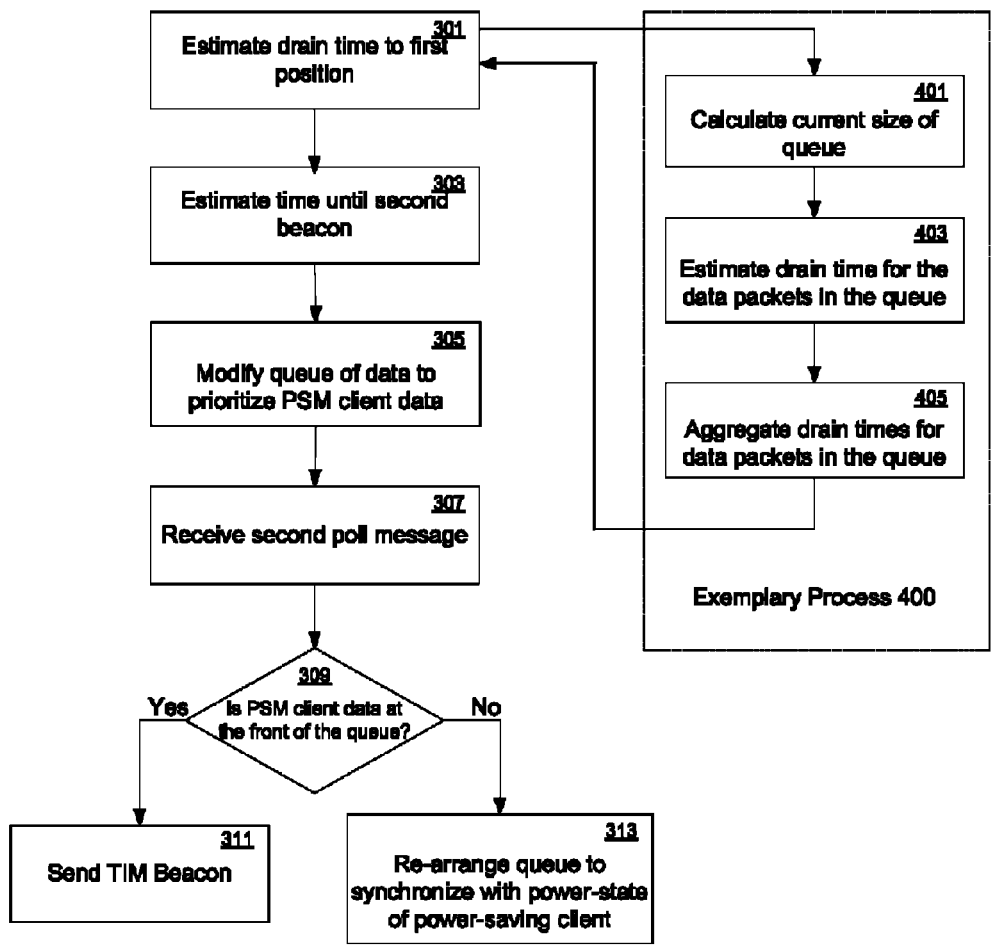
FIG. 4 depicts a flowchart of an exemplary process of estimating a drain time in a queue of data, in accordance with various embodiments.

With reference to FIG. 4, a flowchart of an exemplary process 400 of estimating a drain time in a queue of data is depicted. Steps 401-405 describe exemplary steps comprising the process 400 in accordance with the various embodiments herein described. In one embodiment, steps 401-405 may comprise the steps performed during step 301 of FIG. 3.

At step 401, the current size of the data queue is calculated. Calculation of the size of the queue may comprise, for example, aggregating the size of each data packet in the data queue.

At step 403, the drain time for the data in the data queue is estimated. The drain time comprises the length of time required to transmit a packet (or series of packets) of data. Estimating the drain time may be performed by, for example, cross-referencing each packet of data with the average time required to transmit a packet of data to the intended recipient.

Finally, at step 405, the drain time for each of the data packets up to the position of the data intended for the PSM client is aggregated to calculate an estimated drain time to the first position (e.g., the position of the data intended for the PSM client).

Virtual Access Point Implementation

Figure 5:
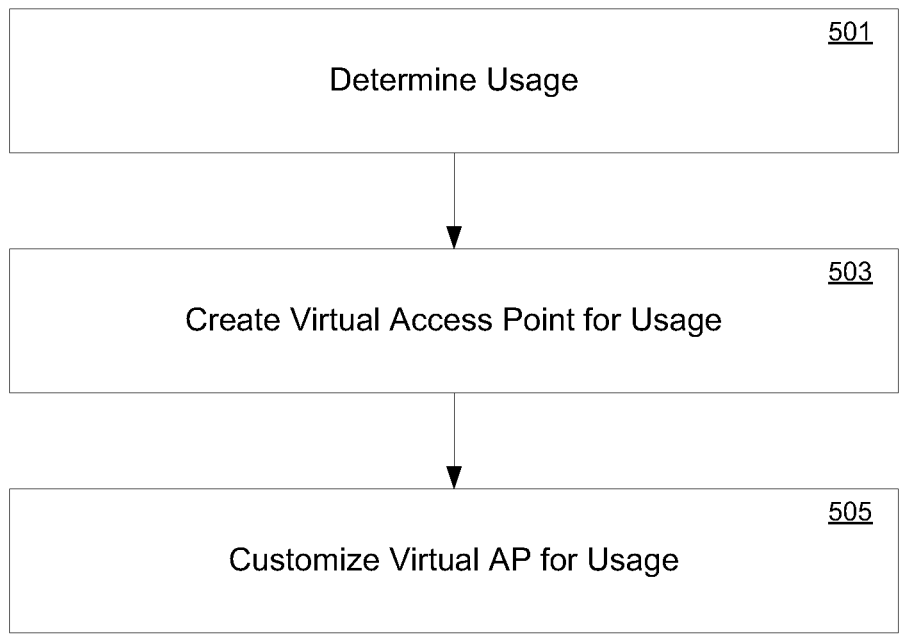
FIG. 5 depicts a flowchart of an exemplary method for employing virtualized access points to manage the power state of wireless network devices, in accordance with various embodiments.

With reference to FIG. 5, a flowchart of an exemplary process 500 for employing virtualized access points to manage the power state of wireless network devices is depicted. Steps 501-505 describe exemplary steps comprising the process 500 in accordance with the various embodiments herein described.

At step 501, a usage for an access point is determined. A usage may comprise, for example, a characterization of the activity being conducted by a wireless network device over the wireless connection with the access point. In some embodiments, the usage may be one of a plurality of usages.

At step 503, a virtual access point is created for the particular usage determined at step 501. In one embodiment, the virtual access point is instantiated in the access point. In some embodiments, a virtual access point may be created for each wireless network client. In alternate embodiments, the number of wireless network clients connecting with the access point may become prohibitively large, such that usages may be bundled according to a class of usages. Exemplary of usage classes may include, for example, power-saving Wi-Fi connectivity, active web browsing, VoIP, or Internet/network gaming, etc. . . . Accordingly, wireless network clients may be classified according to a particular class of usage. The wireless network clients belonging to a certain classification thus is affiliated with, and connects to, the virtualized access point created for the usage.

At step 505, a virtual access point for a particular usage is customized to optimize for the particular usage. Customization may include, for example, synchronizing the queue of data of the virtual access point for each connected wireless client and/or usage. For example, a virtual access point connected to a plurality of PSM clients may be customized to correspond with the PSM clients by constructively enqueuing and re-positioning data to coincide with the delivery of periodic polling beacons such that the transmission of data intended for the PSM clients is optimized to manage the power-state of the PSM client. Specifically, re-positioning the data intended for a power-saving wireless network client in the data queue with the delivery of a specific periodic polling beacon and prioritizing the data intended for the PSM client for the specific polling beacon enables the immediate delivery of data upon the reception of a corresponding poll message, thus reducing the time a power-saving client is required to stay awake to receive the data intended for the power-saving client.

In a further embodiment, a virtual access point may customize to correspond with PSM clients receiving aperiodic polling beacons by determining polling beacons with longer intervals, and enqueuing data to correspond to the longer intervals. Accordingly, the implementation of virtual access points allows the benefits achieved from reducing the time a power-saving client is required to stay awake to receive data to be extended with greater efficiency to multiple clients with power states which may be managed.

Virtual Access Point Customization

Figure 6:
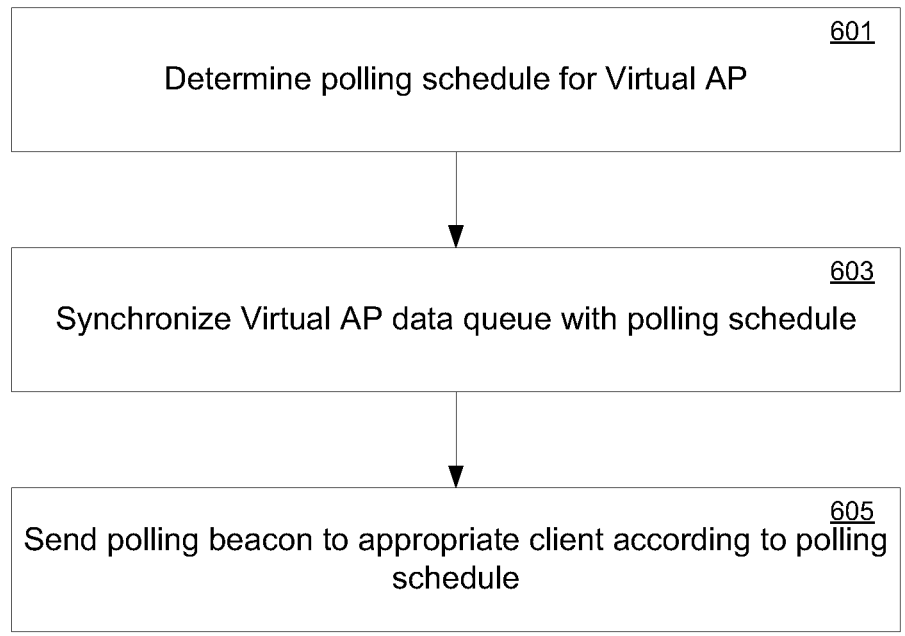
FIG. 6 depicts a flowchart of an exemplary process for customizing a virtual access point for a particular usage, in accordance with various embodiments.

With reference to FIG. 6, a flowchart of an exemplary process 600 of customizing a virtual access point for a particular usage is depicted. Steps 601-605 describe exemplary steps comprising the process 600 in accordance with the various embodiments herein described. In one embodiment, steps 601-605 may comprise the steps performed during step 505 of FIG. 5.

At step 601, a polling schedule is determined for a virtual access point. The polling schedule comprises the estimated schedule of polling beacons delivered by the virtual access point to the connected wireless network clients (or class or wireless network clients). For example, a virtual access point customized for power-saving wireless network clients may have a polling schedule comprising the periodic intervals for one or more of the polling beacons transmitted to the connected power-saving wireless network clients.

At step 603, the data queue of the virtual access point is synchronized with the polling schedule. The data queue of the virtual access point may be synchronized with the polling schedule according to the process described with reference to the process 300 as described with reference to FIG. 3 performed for each wireless network client connected to the virtual access point.

At step 605, once the data queue of a virtual access point is synchronized with the polling schedule for that virtual access point, the delivery of polling beacons (and subsequent reception of poll messages and delivery of data) is performed according to the queue.

Exemplary Virtual Access Point Network Configuration

Figure 7:
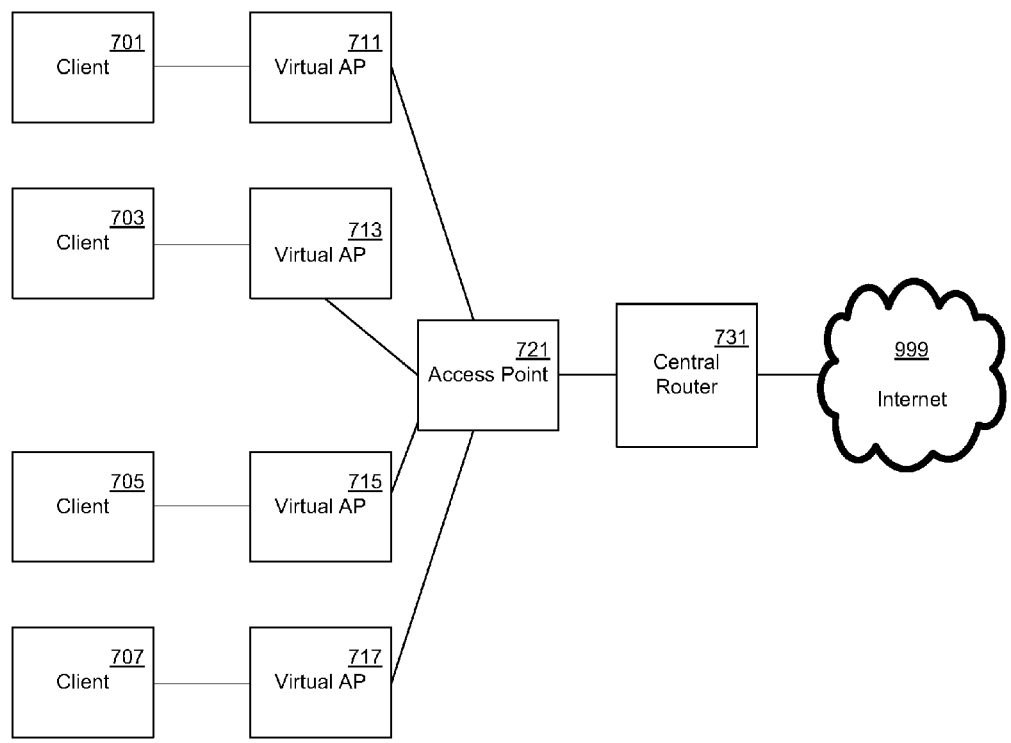
FIG. 7 depicts a graphical representation of an exemplary virtual access point implementation of a network environment, in accordance with various embodiments.

FIG. 7 depicts a graphical representation of an exemplary virtual access point implementation of a network configuration 700 in accordance with various embodiments. While networking environment is shown as incorporating specific, enumerated features and elements, it is understood that such depiction is exemplary. Accordingly, embodiments are well suited to applications involving different, additional, or fewer elements, features, or arrangements.

As shown, exemplary networking environment 700 depicts a relatively simple networking environment utilizing virtual access points: a number of networking client devices, e.g., clients 701, 703, 705, and 707, are wirelessly attached to the network by means of virtualized access points, e.g., virtual access points 711, 713, 715 and 717. As shown, a virtual access point may be instantiated for each particular client. Also, a virtual access point may be instantiated to correspond to a particular activity or rate of power usage. Clients which are performing the activity corresponding to an instantiated virtual access point will be automatically connected to the appropriate virtual access point.

In one embodiment, the virtual access points (711, 713, 715 & 717) are instantiated in the physical access point 721, which is physically connected to a central router 731 communicatively coupled to a network, such as the Internet 999. By allocating virtual access points for each wireless client or class of clients, the virtual access points may be customized to fit the particular usage. Also, by delineating the connection between clients (and/or usages), the power-saving mode may be used to its full extent, thus avoiding the situation when a PSM client remains active whilst other the access point distributes data to other clients. Furthermore, delineating the connection between clients and usages allows the data queue to distribute data to non-power saving clients unmodified.

Exemplary Leveraged Wireless Network Configuration

Figure 8:
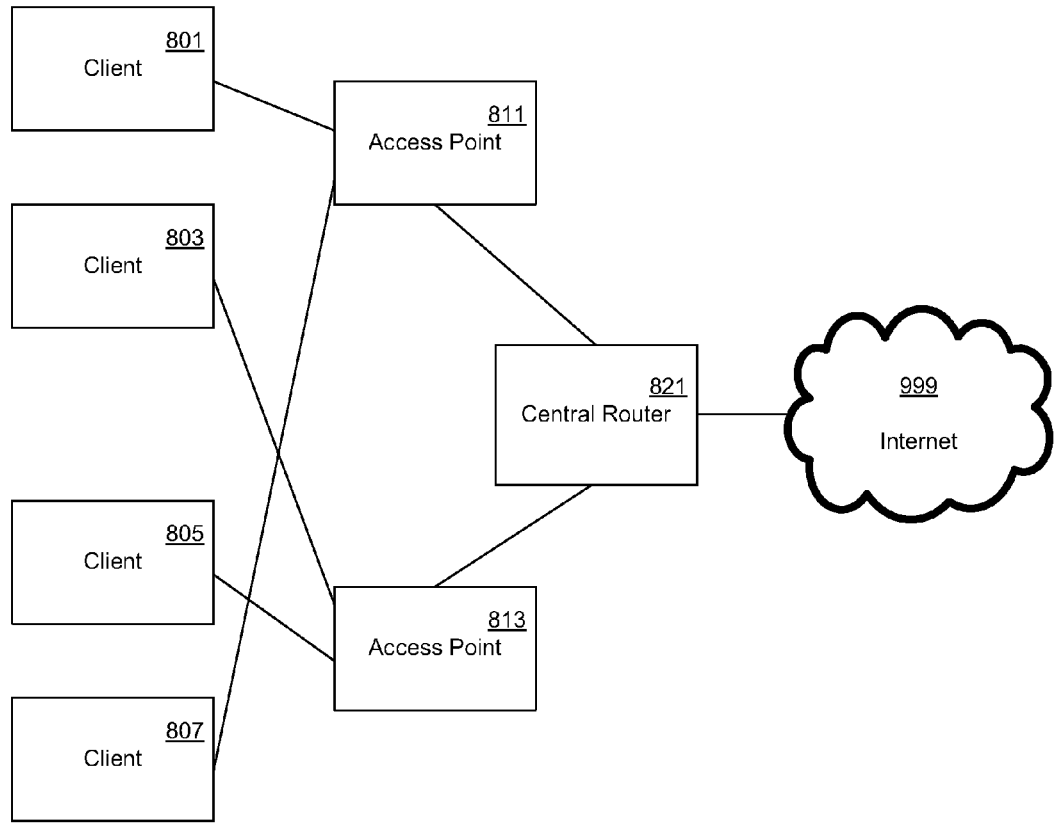
FIG. 8 depicts a graphical representation of an exemplary of an access point leveraging a wireless network environment, in accordance with various embodiments.

With reference now to FIG. 8, a graphical representation of an exemplary of an access point leveraging a wireless network configuration 800 is depicted, in accordance with one embodiment. While exemplary network configuration 800 is shown as incorporating specific, enumerated features and elements, it is understood that such depiction is exemplary. Accordingly, embodiments are well suited to applications involving different, additional, or fewer elements, features, or arrangements.

As shown, exemplary network configuration 800 depicts a network configuration including: a number of network client devices, e.g., clients 801, 803, 805 and 807, wirelessly attached to the network by means of access points, e.g., access points 811 and 813. As shown, access points may be discrete networked proxy computer systems operating as servers, or, alternatively, dedicated access point devices. Also, the access points used in exemplary network configuration 800 may vary, but will typically include layer 2/8 switching and routing functionality. In one embodiment, access points 811 and 813 are physically connected to a central router 821 communicatively coupled to a network, such as the Internet 999. In other embodiments, central router 821 may comprise other edge devices such as a network switch or hub, also with layer 2/8 switching and routing functionality.

As depicted in exemplary network configuration 800, client 801 and client 807 are communicatively coupled to access point 811. Likewise, client 803 and client 805 are communicatively coupled to access point 813. While access point 811 may have greater proximity to client 803 (and thus, typically stronger signal), client 803 may be performing a usage or activity corresponding to the usage or activity dedicated to access point 813. For example, access point 813 may be customized for power-saving clients, such that the rate of power consumption is managed to be relatively low (which may include additional latency in transmission times). Clients 803 and 805 thus may be operating under a PSM.

Conversely, clients 801 and 807 may be partaking in power-intensive usages, such as network gaming. Thus access point 801, which may be customized to improve performance at the cost of saving power would be a more optimal access point to connect to, despite the greater distance (for client 805. In further embodiments, clients may connect to access points at greater distances if an access point experiences a large amount of traffic if other access points in range are otherwise free or not currently being used. Accordingly, the power state of wireless network clients may be managed by leveraging other available access points to provide customized access points for a particular usage.

Basic Computing Device

Figure 9:
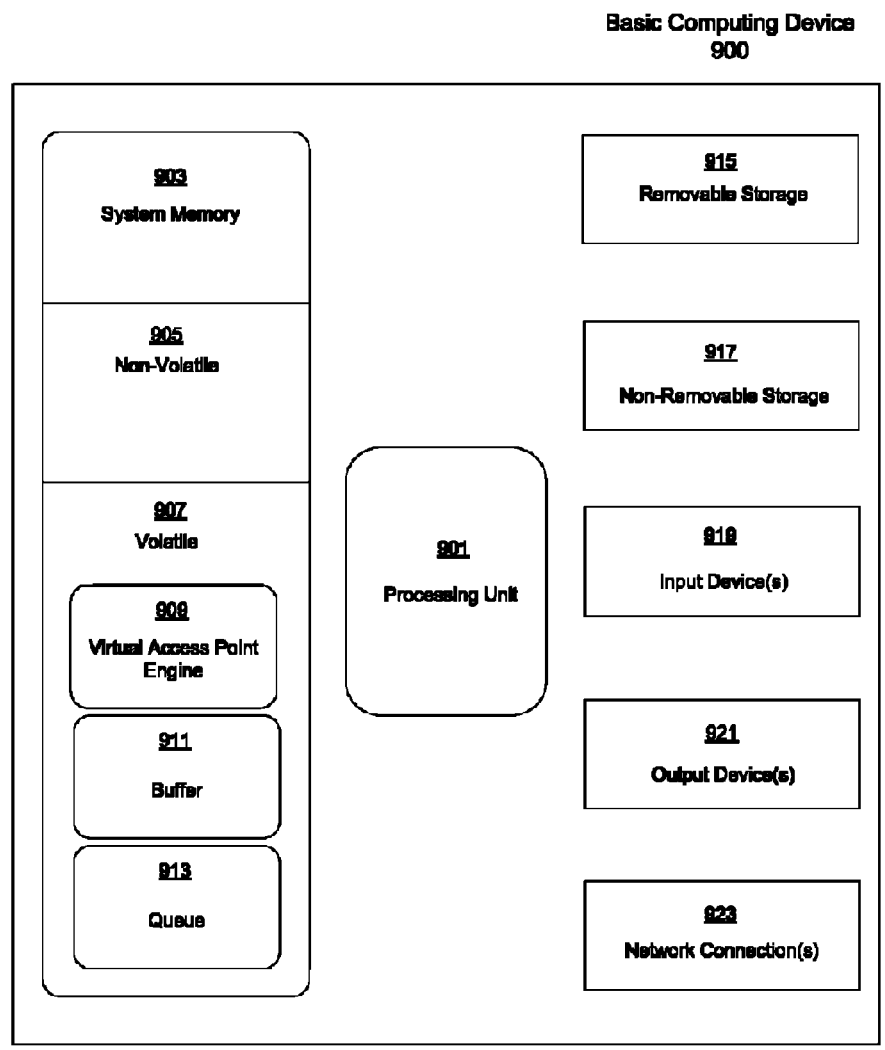
FIG. 9 depicts a graphical representation of a basic computing system, in accordance with various embodiments.

FIG. 9 shows a graphical representation of a basic computing system 900 according to various embodiments. Computing device 900 depicts the components of a basic computer system providing the execution platform for certain software-based functionality in accordance with various embodiments.

Computing device 900 can be implemented as an access point, for example. Similarly, computing device 900 can also be implemented as a proxy device such as a desktop computer system, laptop computer system or server computer system. Computing device 900 typically includes at least some form of computer readable media. Computer readable media can be a number of different types of available media that can be accessed by computing device 900 and can include, but is not limited to, computer storage media.

In its most basic configuration, computing device 900 typically includes processing unit 901 and memory 903. Depending on the exact configuration and type of computing device 900 that is used, memory 903 can be non-volatile 905 (such as ROM, flash memory, etc.), volatile (such as RAM 907), or some combination of the two. In one embodiment, virtual access point engine 909, which instantiates and maintains virtual access points instantiated in computing device 900, is instantiated in the volatile memory 907. The data buffer 911, used to store outstanding data intended for unreceptive client devices as well as the data queue 913 used to distribute the packets to their intended recipients according to a determined order may also be instantiated in volatile memory 907. Similarly, virtual access point engine 909, data buffer 911 and data queue 913 may also be implemented, in whole or in part, in non-volatile memory 905.

Additionally, computing device 900 can include mass storage systems (removable 911 and/or non-removable 913) such as magnetic or optical disks or tape. Accordingly, virtual access point engine 909, data buffer 911 and data queue 913 may also be stored in, and instantiated from both removable 915 and non-removable 917 mass storage systems. Similarly, computing device 900 can include input devices 919 and/or output devices 921 (e.g., such as a display). Additionally, computing device 900 can include network connections 923, such as a network interface connection (NIC) to other devices, computers, networks, servers, etc. using either wired or wireless media. As all of these devices are well known in the art, they need not be discussed in detail.

Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

The invention claimed is:

1. A method for managing a power state of wireless network devices, the method comprising:

determining a usage for a wireless network device in a plurality of wireless network devices in a network;

creating a virtual access point comprising a buffer of data for the usage; and customizing the virtual access point for the usage;

enqueuing data in the buffer of data into a data queue in an order the data is received;

determining a first position in the data queue corresponding to data intended for a power-saving wireless network client;

re-arranging the data queue to be synchronized with the power state of the power-saving wireless network client such that data intended for the power-saving wireless network client is re-positioned in the data queue to coincide with a sending of a polling beacon with a traffic indication map (TIM) field to the power-saving wireless network client according to the data queue, wherein customizing the virtual access point for a usage comprises:
 i. sending a traffic indication map (TIM) beacon to a power-saving wireless network client in response to a receipt of a polling beacon when data intended for the power-saving wireless network client is at front of the data queue;
 ii. receiving a poll message from the power-saving wireless network client; and
 iii. delivering the data intended for the power-saving wireless network client once the poll message from the power-saving wireless network client is received, further wherein a repositioning of the data intended for the power-saving wireless network client in the data queue to coincide with a delivery of a polling beacon with a TIM field queue is not delayed beyond a next scheduled polling beacon for the power-saving wireless network client.

2. The method according to claim 1, wherein the usage corresponds to a specific network client.

3. The method according to claim 1, wherein the usage corresponds to a class of usage, the class of usage corresponding to a usage of a plurality of network clients.

4. The method according to claim 1, wherein customizing the virtual access point for the usage comprises:
determining a polling schedule, the polling schedule comprising a schedule of polling beacons to be delivered to a plurality of network clients corresponding to the virtual access point; and
synchronizing a data queue for the virtual access point to correspond to the polling schedule.

5. The method according to claim 4, wherein synchronizing the data queue further comprises:
modifying the data queue such that the data intended for a power-saving wireless network client will be prioritized in the data queue to coincide with a time when a polling beacon is delivered to the power-saving wireless network client.

6. The method according to claim 1, wherein sending the polling beacon to the power-wireless network client is performed regularly and pre-determined intervals.

7. A system for managing a power states of a plurality of wireless network devices, comprising:
a plurality of virtual access points customized for a plurality of usages, the plurality of virtual access points comprising a buffer of data and a plurality of wireless nodes in a network and being configured to: enqueue data in the buffer of data into a data queue in an order the data is received, determine a first position in the data queue corresponding to data intended for a wireless network device, and re-arrange the data queue to be synchronized with the power state of a power-saving wireless network client such that data intended for the power-saving wireless network client is re-positioned in the data queue to coincide with a delivery of a polling beacon with a traffic indication map (TIM) field to the power-saving wireless network client; and
a plurality of wireless network devices operable to communicate to wireless nodes in the network,
wherein a wireless network device engaging in a particular usage communicates with a virtual access point customized for the particular usage,
further wherein the virtual access point is further configured to:
 i. send a traffic indication map (TIM) beacon to a power-saving wireless network client in response to a receipt of a polling beacon when data intended for the power-saving wireless network client is at front of the data queue;
 ii. receive a poll message from the power-saving wireless network client; and
 iii. deliver the data intended for the power-saving wireless network client once the poll message from the power-saving wireless network client is received,
further wherein the data intended for the power-saving wireless network client is re-positioned in the data queue to coincide with a delivery of a polling beacon with a TIM field queue and is not delayed beyond a next scheduled polling beacon for the power-saving wireless network client.

8. The system according to claim 7, wherein a usage comprises a plurality of activities requiring an approximate rate of power consumption to perform.

9. The system according to claim 7, wherein a usage comprises a transfer of data according to a Voice over Internet Protocol (VoIP).

10. The system according to claim 7, wherein a usage comprises web-browsing.

11. The system according to claim 7, wherein an access point is customized for a usage by adjusting a position of data packets in a data queue in the access point to correspond to a schedule of polling beacons to be delivered to wireless network devices using the access point to transfer data.

12. A non-transitory computer readable storage medium containing program instructions embodied therein for managing a power state of wireless network devices, the program instructions comprising:
instructions to determine a usage for a wireless network device in a plurality of wireless network devices in a network;
instructions to create a virtual access point comprising a buffer of data for the usage;
instructions to customize the virtual access point for the usage
instructions to enqueue data in the buffer of data into a data queue in an order the data is received;
instructions to determine a first position in the data queue corresponding to data intended for a power-saving wireless network client;
instructions to re-arrange the data queue to be synchronized with the power state of the power-saving wireless network client such that data intended for the power-saving wireless network client is re-positioned in the data queue to coincide with a sending of a polling beacon with a traffic indication map (TIM) field to the power-saving wireless network client according to the data queue,
wherein the instructions to customize the virtual access point for a usage comprises:
 i. instructions to send a traffic indication map (TIM) beacon to a power-saving wireless network client in response to a receipt of a polling beacon when data intended for the power-saving wireless network client is at front of the data queue;
 ii. instructions to receive a poll message from the power-saving wireless network client; and
 iii. instructions to deliver the data intended for the power-saving wireless network client once the poll message from the power-saving wireless network client is received, further wherein the instructions to re-arrange the data queue comprises instructions to reposition the data intended for the power-saving wireless network client in the data queue to coincide with a delivery of a polling beacon with a TIM field queue and is not delayed beyond a next scheduled polling beacon for the power-saving wireless network client.

13. The non-transitory computer readable storage medium according to claim 12, wherein the instructions to customize the virtual access point for a usage comprises:
   instructions to determine a polling schedule, the polling schedule comprising a schedule of polling beacons to be delivered to the plurality of network clients corresponding to the virtual access point;
   instructions to synchronize a data queue for the virtual access point to correspond to the polling schedule;
   instructions to send a traffic indication map (TIM) beacon to a power-saving wireless network client in response to a receipt of a polling beacon when data intended for the power-saving wireless network client is at the front of the data queue.

14. The non-transitory computer readable storage medium according to claim 13, wherein the instructions to synchronize the data queue further comprises:
   instructions to modify the data queue such that the data intended for a power-saving wireless network client will be prioritized in the data queue to coincide with a time when a polling beacon is delivered to the power-saving wireless network client.

15. The non-transitory computer readable storage medium according to claim 13, further comprising:
   instructions to enqueue data in the buffer of data into a data queue in the order the data is received;
   instructions to determine a first position in the data queue corresponding to data intended for the power-saving wireless network client;
   instructions to re-arrange the data queue to be synchronized with the power state of the power-saving wireless network client such that data intended for the power-saving wireless network client is re-positioned in the data queue to coincide with a delivery of a polling beacon with a traffic indication map (TIM) field to the power-saving wireless network client.

16. The non-transitory computer readable storage medium according to claim 15, wherein the instructions to send a TIM beacon to the power-saving wireless network client comprises:
   instructions to send a polling beacon with a traffic indication map (TIM) field to the power-saving wireless network client according to the data queue;
   instructions to receive a poll message from the power-saving wireless network client; and
   instructions to deliver the data intended for the power-saving wireless network client once the poll message from the power-saving wireless network client is received.

* * * * *